United States Patent
Matsushita et al.

(10) Patent No.: US 10,207,353 B2
(45) Date of Patent: Feb. 19, 2019

(54) INDIRECT SPOT WELDING METHOD

(71) Applicant: JFE Steel Corporation, Tokyo (JP)

(72) Inventors: Muneo Matsushita, Tokyo (JP); Rinsei Ikeda, Tokyo (JP)

(73) Assignee: JFE Steel Corporation (JP)

( * ) Notice: Subject to any disclaimer, the term of this patent is extended or adjusted under 35 U.S.C. 154(b) by 290 days.

(21) Appl. No.: 14/783,094

(22) PCT Filed: Mar. 6, 2014

(86) PCT No.: PCT/JP2014/001257
§ 371 (c)(1),
(2) Date: Oct. 8, 2015

(87) PCT Pub. No.: WO2014/167772
PCT Pub. Date: Oct. 16, 2014

(65) Prior Publication Data
US 2016/0045976 A1    Feb. 18, 2016

(30) Foreign Application Priority Data
Apr. 9, 2013    (JP) .................................. 2013-081379

(51) Int. Cl.
*B23K 11/11*    (2006.01)
*B23K 11/30*    (2006.01)
(Continued)

(52) U.S. Cl.
CPC ............. *B23K 11/11* (2013.01); *B23K 11/115* (2013.01); *B23K 11/30* (2013.01); *B23K 11/315* (2013.01);
(Continued)

(58) Field of Classification Search
CPC ......... B23K 9/10; B23K 11/115; B23K 11/24; B23K 11/312; B23K 11/11; B23K 11/30;
(Continued)

(56) References Cited

U.S. PATENT DOCUMENTS

2009/0218323 A1    9/2009    Abe et al.
2011/0272384 A1*   11/2011   Matsushita ........... B23K 11/115
                                                              219/91.2

FOREIGN PATENT DOCUMENTS

CN        2785779        6/2006
CN        2785779 Y      6/2006
(Continued)

OTHER PUBLICATIONS

Machine translation (Aug. 31, 2017) of Kawai Makoto JP 09-122928 (1997).*
(Continued)

*Primary Examiner* — Brian W Jennison
(74) *Attorney, Agent, or Firm* — DLA Piper LLP (US)

(57) ABSTRACT

An oval nugget can reliably be obtained with this indirect spot welding method. In this indirect spot welding method, an electrode end portion of a welding electrode includes a tip of the welding electrode, and as viewed from the tip, the electrode end portion has a two-step dome shape formed by a first curved surface with a curvature radius $r_1$ (mm) located within a range of a circle of radius R (mm) centering on the tip and a second curved surface with a curvature radius $r_2$ (mm). $2\sqrt{t} \leq R \leq 6\sqrt{t}$ (1), $30 \leq r_1$ (2), and $6 \leq r_2 \leq 12$ (3), where t is the sheet thickness (mm) of a thinner metal sheet.

4 Claims, 4 Drawing Sheets

(51) Int. Cl.
  *B23K 11/31*  (2006.01)
  *B23K 35/02*  (2006.01)
  *B23K 101/18*  (2006.01)

(52) U.S. Cl.
  CPC .......... *B23K 35/02* (2013.01); *B23K 35/0205* (2013.01); *B23K 35/0261* (2013.01); *B23K 2101/18* (2018.08)

(58) Field of Classification Search
  CPC .. B23K 11/315; B23K 35/02; B23K 35/0205; B23K 35/0261; B23K 2201/04; B23K 2201/18
  USPC ................................................ 219/86.9, 86.1
  See application file for complete search history.

(56) References Cited

FOREIGN PATENT DOCUMENTS

| JP | 09-122928 A | 5/1997 |
|---|---|---|
| JP | 2006-198676 A | 8/2006 |
| JP | 2010-194609 A | 9/2010 |
| JP | 2012-011398 | 1/2012 |
| JP | 2012-091203 | 5/2012 |
| JP | 2012-157888 | 8/2012 |
| JP | 2012-166259 | 9/2012 |

OTHER PUBLICATIONS

Japanese Office Action dated Mar. 15, 2016, of corresponding Japanese Application No. 2014-527420, along with a Concise Statement of Relevance of Office Action in English.
Supplementary European Search Report dated Apr. 1, 2016, of corresponding European Application No. 14783158.0.
Korean Office Action dated Aug. 19, 2016, of corresponding Korean Application No. 2015-7026911, along with a Concise Statement of Relevance of Office Action in English.
Chinese Office Action dated Sep. 19, 2016, of corresponding Chinese Application No. 201480020462.8, along with an English translation of the Search Report.
Chinese Office Action dated May 16, 2017, of corresponding Chinese Application No. 201480020462.8, along with a Concise Statement of Relevance of Office Action in English.
Japanese Office Action dated Sep. 29, 2015 of corresponding Japanese Application No. 2014-527420 along with an English translation.
European Communication dated Aug. 28, 2017, of corresponding European Application No. 14783158.0.

* cited by examiner

PRIOR ART

INDIRECT SPOT WELDING METHOD

TECHNICAL FIELD

This disclosure relates to an indirect spot welding method of welding a member composed of two overlapping metal sheets by holding a spot welding electrode against the metal sheet at one side while applying pressure with the spot welding electrode, attaching a feeding point to the metal sheet at the other side at a location remote from the spot welding electrode, and allowing current to flow between the spot welding electrode and the feeding point. In particular, this disclosure relates to an indirect spot welding method that yields a suitable nugget even in the case of a large current flow between the overlapping metal sheets at a location other than the weld in the member, i.e., in the case of large shunt current.

BACKGROUND

To weld automobile bodies and automobile components, resistance spot welding, mainly direct spot welding, has conventionally been used. Recently, however, indirect spot welding and the like have been used.

The characteristics of such direct spot welding and indirect spot welding are described below with reference to FIG. 1.

Those two forms of spot welding are alike in that at least two overlapping metal sheets are welded.

FIG. 1(A) illustrates the direct spot welding method. As illustrated, direct spot welding is a method that sandwiches two overlapping metal sheets 1 and 2 from above and below with a pair of electrodes 3 and 4 and applies current while applying pressure with the electrodes 3 and 4 to form a weld 5 using resistance heat generated between the metal sheets. The electrodes 3 and 4 are provided with force controllers 6 and 7 and a current controller 8, which constitute a mechanism that allows for control of the electrode force and the current.

The indirect spot welding method illustrated in FIG. 1(B) is a method in which a weld 25 is formed between two overlapping metal sheets 21 and 22 by holding an electrode 23 against one of the metal sheets 21 while applying pressure with the electrode 23, attaching a feeding point 24 to the other metal sheet 22 at a location remote from the electrode 23, and allowing current to flow between the electrode 23 and the feeding point 24.

Current control standards used by transport equipment manufacturers for welds formed by resistance spot welding often require that welds be oval nuggets formed after complete fusion between the metal sheets such as those obtained in direct spot welding. Therefore, between the above-described welding methods, the direct spot welding method is used when there is ample space for an opening allowing the metal sheets to be sandwiched from above and below.

In actual welding, however, there is often not enough room, and it is often difficult to sandwich the metal sheets from above and below in a closed cross-sectional structure. The indirect spot welding method is used in such cases.

When the indirect spot welding method is used in applications such as those described above, the overlapping metal sheets are pressed by an electrode from only one side, with the other side of the metal sheets being unsupported in midair. Therefore, unlike the direct spot welding method that sandwiches the metal sheets with electrodes on both sides, it is not possible to apply a high electrode force locally directly below the electrode. Furthermore, since the electrode sinks into the metal sheet during application of current, the conditions of contact between the electrode and the metal sheet and between the metal sheets change.

For these reasons, in conventional indirect spot welding, the current path between the overlapping metal sheets is unstable, making it difficult to reliably obtain an oval nugget formed after fusion between the metal sheets. In particular, when the overlapping metal sheets are pressed by an electrode from only one side, with the other side being unsupported in midair, and both edges of the metal sheets are restrained, then current flow between the metal sheets at a location other than the weld, i.e., shunt current, increases, making it even more difficult to reliably obtain an oval nugget.

As a welding electrode that can obtain a weld with predetermined strength and that can be applied to indirect spot welding, JP 2006-198676 A discloses an "electrode for resistance welding having a generally conical tip, comprising: a conical surface in which a tip angle of a cone is 120° to 165°; and a flat portion with a diameter of 1.5 mm to 3 mm in a central portion of a tip of the cone."

With regard to a weld formed according to the disclosed technique, however, JP '676 discloses that "observation of metal structures of overlapping portions between the metal sheets 11 and 12 reveals events where, as compared to a conventional typical nugget, the metal of the overlapping portions between the metal sheets 11 and 12 includes many portions in which the metal is finely and partially fused and is recrystallized. This is the case where the metal sheets 11 and 12 are joined together by so-called diffusion bonding, and the metal sheets 11 and 12 may be joined together by events different from those of conventional typical nuggets" (paragraph [0038] of JP '676). In other words, a problem exists in that the weld obtained using the welding electrode disclosed in JP '676 is not necessarily an oval nugget formed after complete fusion, as in a nugget resulting from direct spot welding.

As described above, current control standards used by transport equipment manufacturers for spot welds often require that welds be oval nuggets. Therefore, even if a predetermined weld strength can be obtained for a weld, the weld will not satisfy the control standards if the nugget is not an oval nugget formed after complete fusion. Accordingly, there is a desire for an indirect spot welding method that can more reliably obtain an oval nugget even when current flow between metal sheets at a location other than the weld, i.e., shunt current, is large.

It could therefore be helpful to provide an indirect spot welding method that can more stably obtain an oval nugget formed after fusion between metal sheets even when current flow between the metal sheets at a location other than the weld, i.e., shunt current, is large.

SUMMARY

We discovered:
a) As described above, with indirect spot welding, it is not easy to achieve sufficient heat generation to form a weld between the overlapping metal sheets directly below the electrode, unlike in direct spot welding. It is therefore difficult to form a nugget. In particular, it is even more difficult to form a nugget when current flow between the metal sheets at a location other than the weld, i.e., shunt current, is large.
b) To resolve the above-described problem, it is necessary to use a welding electrode in which the electrode end portion has an appropriate shape, allowing for high current density to be maintained between the overlapping metal sheets directly below the electrode, even when the electrode sinks into the metal sheet during the application of current.

c) The shape of the electrode end portion of the welding electrode is related to the sheet thickness of the metal sheet, between the overlapping metal sheets to be welded, that serves as the standard for the nugget diameter. Specifically, the sheet thickness of the metal sheet that serves as the standard for the nugget diameter is the sheet thickness of the thinner metal sheet in the member composed of two overlapping metal sheets.

d) In addition to using the welding electrode with the above-described shape, it is more effective to precisely control the current and the time thereof during application of current, to precisely control the electrode force and the time thereof during application of current, or to precisely control the current, the electrode force, and the time thereof during application of current.

We thus provide:

(1) An indirect spot welding method of welding a member including two overlapping metal sheets by holding a spot welding electrode against a metal sheet at one side of the member while applying pressure with the spot welding electrode, attaching a feeding point to a metal sheet at the other side of the member at a location remote from the spot welding electrode, and allowing current to flow between the spot welding electrode and the feeding point, wherein an electrode end portion of the welding electrode includes a tip of the welding electrode, and as viewed from the tip, the electrode end portion has a two-step dome shape formed by a first curved surface with a curvature radius $r_1$ (mm) located within a range of a circle of radius R (mm) centering on the tip and a second curved surface with a curvature radius $r_2$ (mm) located around the first curved surface, and $$2\sqrt{t} \leq R \leq 6\sqrt{t} \quad (1)$$

$$30 \leq r_1 \quad (2)$$

$$6 \leq r_2 \leq 12 \quad (3)$$

where t is a sheet thickness (mm) of a thinner metal sheet in the member.

(2) The method of (1), wherein the current is kept constant from turning on to turning off electricity; and with respect to an electrode force of the welding electrode, a time from turning on electricity is divided into two time periods, a first time period $t_1$ and a next time period $t_2$, and after an electrode force $F_1$ is applied in the first time period $t_1$, an electrode force $F_2$ that is lower than the electrode force $F_1$ is applied in the next time period $t_2$.

(3) The method of (1), wherein with respect to an electrode force of the welding electrode and the current, a time from turning on electricity is divided into two time periods, a first time period $t_1$ and a next time period $t_2$, and after an electrode force $F_1$ is applied and a current $C_1$ is applied in the first time period $t_1$, an electrode force $F_2$ that is lower than the electrode force $F_1$ is applied and a current $C_2$ that is higher than the current $C_1$ is applied in the next time period $t_2$.

(4) The method of (1), wherein with respect to an electrode force of the welding electrode, a time from turning on electricity is divided into two time periods, a first time period $t_{F1}$ and a next time period $t_{F2}$, and after an electrode force $F_1$ is applied in the first time period $t_{F1}$, an electrode force $F_2$ that is lower than the electrode force $F_1$ is applied in the next time period $t_{F2}$, and with respect to the current, a time from turning on electricity is divided into two time periods, a first time period $t_{C1}$ and a next time period $t_{C2}$, independent of the time periods $t_{F1}$ and $t_{F2}$, and after a current $C_1$ is applied in the first time period $t_{C1}$, a current $C_2$ that is higher than the current $C_1$ is applied in the next time period $t_{C2}$.

In our method, a welding electrode with an appropriately shaped electrode end portion is used. Therefore, an oval nugget formed after fusion between metal sheets can more reliably be obtained even when current flow between the metal sheets at a location other than the weld, i.e., shunt current, is large.

Figure 1A:
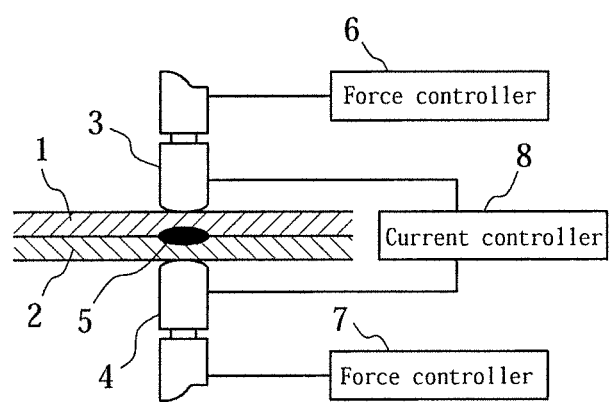
FIG. 1(A) illustrates welding with a direct spot welding method.
Figure 1B:
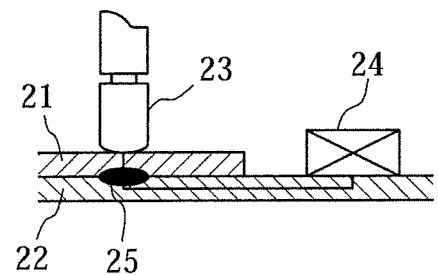
FIG. 1(B) illustrates welding with an indirect spot welding method.

REFERENCE SIGNS LIST 1, 2 Steel sheet
3, 4 Electrode
5 Weld
6, 7 Force controller
8 Current controller
21, 22 Steel sheet
23 Welding electrode
24 Feeding point
25 Weld
30 Electrode end portion
31 First curved surface
32 Second curved surface

DETAILED DESCRIPTION

The following provides a detailed explanation in accordance with the drawings.

In our indirect spot welding method, a member composed of two overlapping metal sheets is welded by holding a spot welding electrode against the metal sheet at one side of the member while applying pressure with the spot welding electrode, attaching a feeding point to the metal sheet at the other side of the member at a location remote from the spot welding electrode, and allowing current to flow between the spot welding electrode and the feeding point. As described below in the Examples with reference to FIG. 4, when the member composed of the overlapping metal sheets is placed on a concave metal jig, a ground electrode is attached to the bottom of the jig, pressure is applied to the overlapping metal sheets with the welding electrode from only one side, and the other side is unsupported in midair, then the combination of the metal jig and the earth electrode corresponds to the feeding point.

Figure 2:
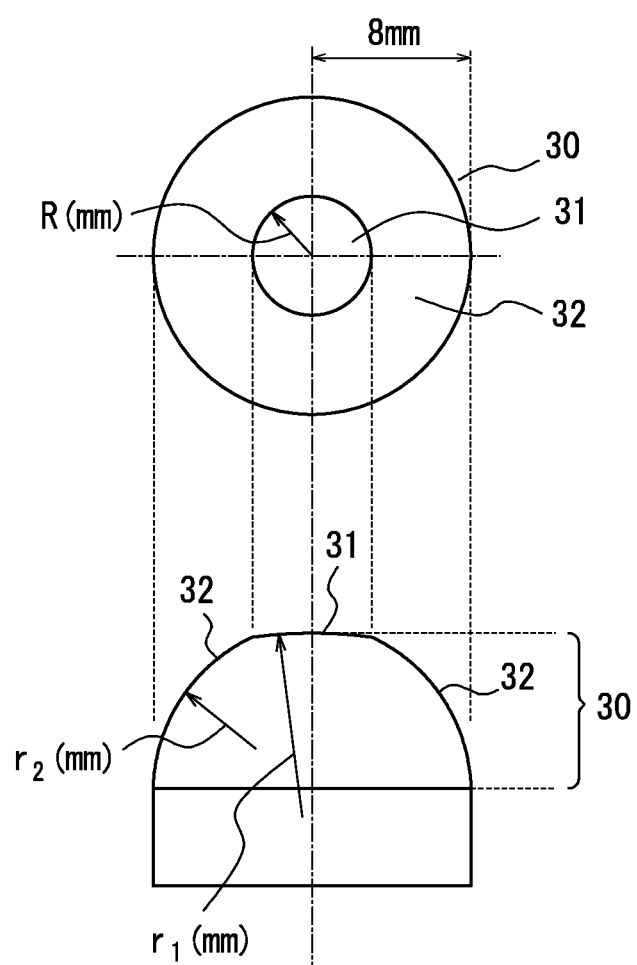
FIG. 2 illustrates the shape of the electrode end portion of the welding electrode in one of the disclosed examples.

One feature of our method is the shape of the electrode end portion of the welding electrode. FIG. 2 illustrates the shape of the electrode end portion of the welding electrode in one of the disclosed examples of our method. An electrode end portion 30 of the welding electrode includes a tip of the welding electrode, and as viewed from the tip, the electrode end portion 30 has a two-step dome shape formed by a first curved surface 31 with a curvature radius $r_1$ (mm) located within a range of a circle of radius R (mm) centering on the tip and a second curved surface 32 with a curvature radius $r_2$ (mm) located around the first curved surface. Expressions (1) to (3) below are satisfied.

By having the electrode end portion 30 form a two-step dome shape and setting the first curved surface 31 to be a curved surface with a larger curvature radius than that of the second curved surface 32, a high current density can be maintained between the overlapping metal sheets directly below the electrode even if the electrode sinks into the metal sheets during application of current. Furthermore, by setting the first curved surface 31 to have a larger curvature radius than that of the second curved surface 32, the area of contact between the electrode and the metal sheet can be sufficiently guaranteed at the time of turning on electricity, and it is possible to resolve problems such as the current density becoming excessively large, causing fused metal to splatter from the metal sheet at the side in contact with the electrode. Also, the second curved surface 32 has a smaller curvature radius than that of the first curved surface 31. Therefore, when the electrode sinks into the metal sheet during application of current and the second curved surface 32 begins to be in contact with the metal sheet in addition to the first curved surface 31, an increase in the area of contact between the electrode and the metal sheet can be suppressed.

One feature of our method is that the radius R (mm) that determines the boundary between the first curved surface 31 and the second curved surface 32 is determined by employing an integer multiple of the square root of the sheet thickness t (mm) of the metal sheet, between the overlapping metal sheets to be welded, that serves as the standard for the nugget diameter. The sheet thickness t of the metal sheet that serves as the standard for the nugget diameter is the sheet thickness of the thinner metal sheet when spot welding a member composed of two overlapping metal sheets. When the two sheets are of the same thickness, the sheet thickness t is the sheet thickness of each sheet.

In general, in a sheet combination formed by a member composed of two overlapping metal sheets, the required value of the nugget diameter is determined by an integer multiple of the square root of the sheet thickness of the thinner sheet. On the other hand, when the radius R is an appropriate size, then, during the process of the area of contact between the electrode and the metal sheet increasing during welding, the nugget diameter can be prevented from increasing to a range exceeding the radius R, thereby yielding a good nugget diameter. The radius R and the nugget diameter are correlated. Therefore, when obtaining a required nugget diameter in any sheet combination to set the radius R appropriately, it suffices to restrict the radius R using an integer multiple of the square root of the sheet thickness of the thinner sheet.

If the radius R is in a range of less than $2\sqrt{t}$ (mm), at the time of turning on electricity, the area of contact between the electrode and the metal sheet is restricted to an extremely small range. The current density therefore becomes excessive, leading to problems such as fused metal splattering from the metal sheet at the side in contact with the electrode. On the other hand, if the radius R exceeds $6\sqrt{t}$ (mm), then when the electrode sinks into the metal sheet during application of current and the second curved surface 32 begins to be in contact with the metal sheet in addition to the first curved surface 31 as described above, the effect of suppressing an increase in the area of contact between the electrode and the metal sheet cannot be sufficiently obtained. Therefore, the radius R (mm) is restricted to Expression (1) below:

$$2\sqrt{t} \leq R \leq 6\sqrt{t} \text{(mm)} \qquad (1).$$

t is the sheet thickness (mm) of the above-described thinner metal sheet.

To more reliably obtain the above-described effects, the radius R is more preferably $3\sqrt{t} \leq R \leq 5\sqrt{t}$ (mm).

With regard to the curvature radius $r_1$ (mm) of the first curved surface 31, by setting $r_1$ to be 30 mm or more, the area of contact between the electrode and the metal sheet can be sufficiently guaranteed at the time of turning on electricity, and it is possible to resolve problems such as the current density becoming excessively large, causing fused metal to splatter from the metal sheet at the side in contact with the electrode. Therefore, the curvature radius $r_1$ (mm) is Expression (2) below:

$$30 \leq r_1 \qquad (2).$$

To more reliably obtain the above-described effects, $r_1$ is more preferably 40 mm or more. The curvature radius may be also considered infinity, and the first curved surface may be set to a flat surface.

With regard to the curvature radius $r_2$ (mm) of the second curved surface 32, if $r_2$ is less than 6 mm, the electrode sinks into the metal plate excessively during application of current, causing unnecessary deformation of the weld between the metal sheets and becoming the cause of a crack. Setting $r_2$ to less than 6 mm is therefore not preferable. On the other hand, if $r_2$ exceeds 12 mm, then when the electrode sinks into the metal sheet during application of current and the second curved surface 32 begins to be in contact with the metal sheet in addition to the first curved surface 31, the effect of suppressing an increase in the area of contact cannot be sufficiently obtained. Therefore, the curvature radius $r_2$ (mm) is restricted to Expression (3) below:

$$6 \leq r_2 \leq 12 \qquad (3).$$

To more reliably obtain the above-described effects, the curvature radius $r_2$ (mm) is more preferably $8 \leq r_2 \leq 10$.

The electrode radius of the bottom of the electrode end portion 30 of the welding electrode may, for example, be set to 8 mm as in FIG. 2 and may be suitably set to approximately 4.0 mm to 12.5 mm.

As described above, in our indirect spot welding method, the first curved surface 31 and the second curved surface 32 that constitute the end portion 30 of the welding electrode satisfy Expressions (1) to (3) above. Therefore, the current density between the metal sheets can be made appropriate. Hence, an oval nugget formed after fusion between the metal sheets can more reliably be obtained even when current flow between the metal sheets at a location other than the weld, i.e., shunt current, is large.

Any metal sheets may be used with our method such as steel metal sheets. The sheet thickness t of the thinner metal sheet that is targeted in our method is approximately 0.5 mm to 1.8 mm, and the total sheet thickness of the member composed of the overlapping metal sheets is approximately 1 mm to 4 mm.

In indirect spot welding according to our method, the time period from turning on to turning off electricity, control of the electrode force F, and control of the current C are not restricted and may be selected appropriately. For example, a suitable nugget can be stably obtained even if the electrode force F and the current C are kept constant from the start to the end of application of current. In this case, the welding time may be approximately 0.06 s to 0.60 s, the electrode force F may be approximately 100 N to 1500 N, and the current C may be approximately 4 kA to 12 kA.

Figure 3A:
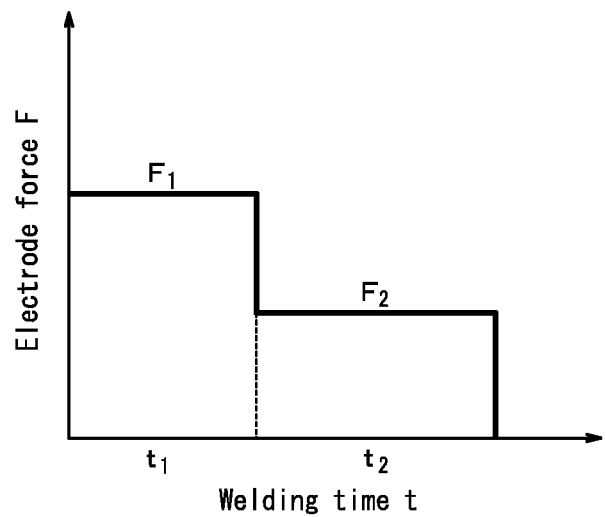
FIG. 3(A) illustrates the relationship between welding time and electrode force.
Figure 3B:
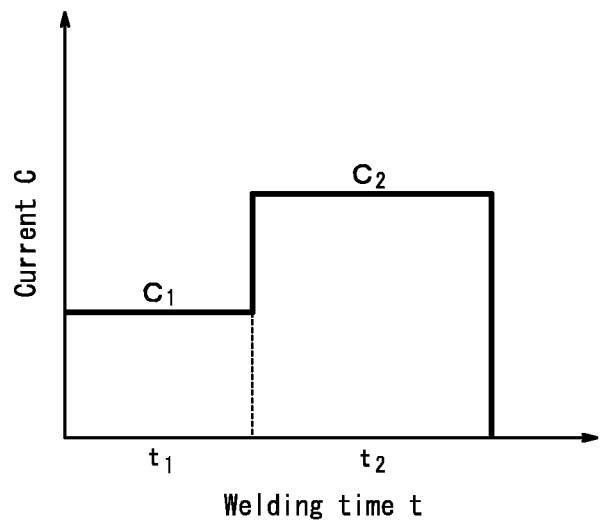
FIG. 3(B) illustrates the relationship between welding time and current in one of the disclosed examples.

As described above, in our method, the time period from turning on to turning off electricity, control of the electrode force F, and control of the current C are not restricted. In addition to using a welding electrode such that the shape of the electrode end portion satisfies Expressions (1) to (3) above, however, the welding time is preferably divided, and the electrode force of the welding electrode and the current are preferably controlled. In another one of the disclosed examples, the basic relationship between the welding time and the electrode force and between the welding time and the current are respectively illustrated in FIGS. 3(A) and 3(B). By performing such control, a more pronounced effect may be obtained. The suitable relationship between the welding time and the electrode force and between the welding time and the current in this example are described below.

In this example, with regard to the electrode force of the welding electrode and the current that is applied, preferably the time from turning on electricity is simultaneously or independently divided into two time periods, in each of which one or both of an electrode force F of the welding electrode and a current C are controlled. When the electrode force F and/or the current C are to be simultaneously controlled, the divided time periods are denoted by $t_1$ and $t_2$. When both the electrode force F and the current C are to be independently controlled, the time periods that divide the electrode force F are denoted by $t_{F1}$ and $t_{F2}$, and the time periods that divide the current C are denoted by $t_{C1}$ and $t_{C2}$. In the respective time periods, the electrode forces are denoted by $F_1$ and $F_2$, and the currents are denoted by $C_1$ and $C_2$.

In this example, the electrode force $F_1$ and the current $C_1$ are applied in time period $t_1$.

The time period $t_1$ is a time period in which electricity is turned on while the welding electrode is being held against the overlapping metal sheets by applying pressure with the welding electrode, and formation of a fused portion is started by heat generated due to contact resistance between the metal sheets. When performing indirect spot welding in which the overlapping metal sheets are pressed by the welding electrode from only one side, with the other side of the metal sheets being unsupported in midair, the electrode force $F_1$ cannot be as high as the electrode force applied in direct spot welding where metal sheets are sandwiched by electrodes on both sides. However, if the electrode force $F_1$ is too low, the area of contact between the electrode and the metal sheet becomes extremely small, and the current density increases excessively. This results in fusion and splattering of the metal sheet surface and causes considerable damage to the surface shape. Therefore, to prevent such a problem, the electrode force $F_1$ is preferably selected appropriately.

The current $C_1$ needs to be high enough to allow fusion to begin due to heat generated between the metal sheets. An excessively high current $C_1$, however, results in fusion and splattering of the metal sheet surface, as described above. This not only causes surface cavities and considerable damage to the appearance, but also causes degradation in joint strength. To prevent such problems, it is preferable to select the current $C_1$ appropriately.

In this example, the electrode force $F_2$ and the current $C_2$ are applied in time period $t_2$, which follows time period $t_1$.

The time period $t_2$ is a stage of further developing the fused portion that started to form in time period $t_1$. When indirect spot welding is performed in a state where the metal sheets are softened around the electrode by heat generated by application of current, with the opposite side from the electrode being unsupported in midair, the electrode end portion sinks into the metal sheet due to softening of the metal sheets. This increases the area of contact between the electrode and the metal sheet and between the metal sheets, thus reducing the current density. As a result, it is not possible to generate heat sufficient to develop a nugget. Therefore, in the time period $t_2$, to prevent the electrode end portion from sinking into the metal sheet, the electrode force $F_2$ is preferably set to be lower than the electrode force $F_1$.

Conversely, the current $C_2$ is preferably set to be higher than the current $C_1$ to prevent a decrease in current density resulting from an increase in the area of contact caused by sinking of the electrode as described above. However, an excessively high current results in splattering and burn-through of the fused metal from the metal sheet surface opposite the electrode, which not only causes considerable damage to the appearance, but also causes degradation in joint strength. Therefore, to prevent such a problem, the current $C_2$ is preferably selected appropriately.

In the example described above, the time from turning on electricity is divided into two time periods, and the electrode force F and current C are both controlled simultaneously. However, another of the examples may be configured to control only the electrode force, or more preferably to control both the electrode force F and current C independently.

In other words, similar effects can be achieved by setting the currents $C_1$ and $C_2$ to be equal and the electrode force $F_2$ to be lower than the electrode force $F_1$ in time periods $t_1$ and $t_2$. However, as described above, a more significant effect can be achieved by setting the electrode force $F_2$ to be lower than the electrode force $F_1$ and the current $C_2$ to be higher than the current $C_1$ in time periods $t_1$ and $t_2$.

Furthermore, with regard to the electrode force F, the time from turning on electricity is preferably divided into time periods $t_{F1}$ and $t_{F2}$, and the electrode force $F_2$ is preferably set to be lower than the electrode force $F_1$. With respect to the current C, the time from turning on electricity is preferably divided into time periods $t_{C1}$ and $t_{C2}$ independent of time periods $t_{F1}$ and $t_{F2}$, and the current $C_2$ is preferably set to be higher than the current $C_1$. A more significant effect can be achieved by thus optimally varying the electrode force and current in time periods that are independent of each other.

When the time from turning on electricity is divided into two time periods $t_1$ and $t_2$ and both the electrode force F and current C are controlled simultaneously, the time period $t_1$ is preferably in the range of approximately 0.02 s to 0.30 s, and the time period $t_2$ is preferably in the range of approximately 0.10 s to 0.60 s. In the time period $t_1$, preferably the electrode force $F_1$ is set to approximately 300 N to 2000 N and the current $C_1$ to approximately 2.0 kA to 10.0 kA, and in the time period $t_2$, preferably the electrode force $F_2$ to set to approximately 100 N to 1500 N, and the current $C_2$ to approximately 2.5 kA to 12.0 kA.

In the time periods $t_1$ and $t_2$, when the currents $C_1$ and $C_2$ are set to be equal and the electrode force $F_2$ is set to be lower than the electrode force $F_1$, the constant current is preferably set to be approximately 2.5 kA to 10 kA.

When both the electrode force F and current C are controlled independently, it is preferable that, with respect to the electrode force F, the time period $t_{F1}$ be approximately 0.02 s to 0.30 s and the time period $t_{F2}$ be approximately 0.10 s to 0.60 s, and that the electrode force $F_1$ in the time period $t_{F1}$ be approximately 300 N to 2000 N and the electrode force $F_2$ in the time period $t_{F2}$ be approximately 100 N to 1500 N. It is also preferable that, with respect to the current C, the time period $t_{C1}$ be approximately 0.02 s to 0.30 s and the time period $t_{C2}$ be approximately 0.10 s to 0.60 s, and that the current $C_1$ in the time period $t_{C1}$ be approximately 2.0 kA to 10.0 kA and the current $C_2$ in the time period $t_{C2}$ be approximately 2.5 kA to 12.0 kA.

EXAMPLES

Example 1

Figure 4:
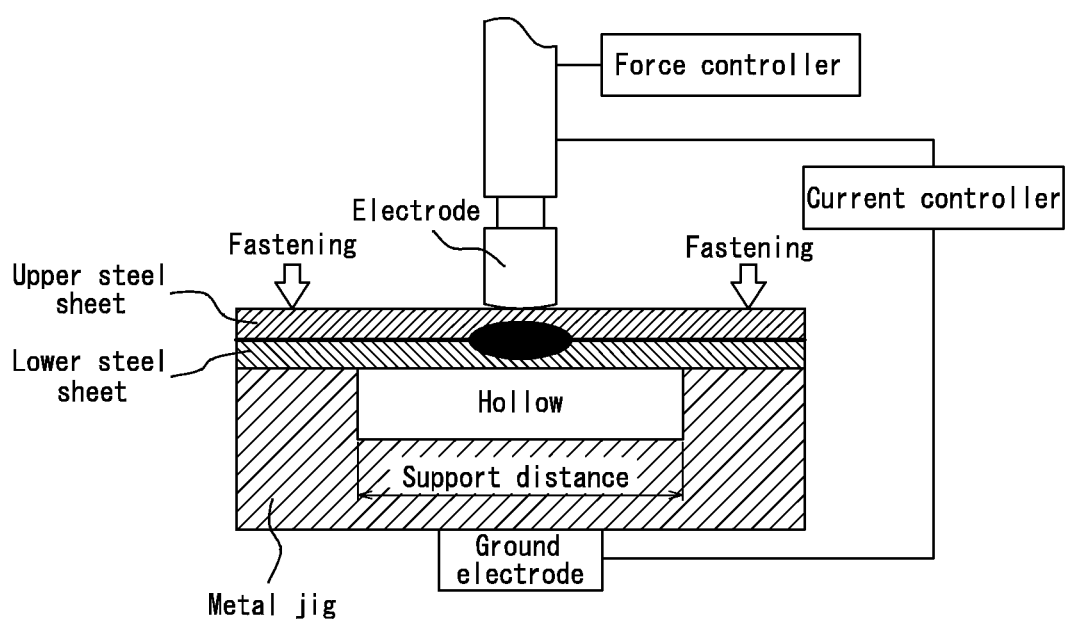
FIG. 4 illustrates welding in Examples 1 and 2.

An indirect spot welding method was performed with a configuration like the one illustrated in FIG. 4.

A member composed of two overlapping steel sheets was produced by combining an upper steel sheet and a lower steel sheet that were SPC 270 steel sheets having a tensile strength of 270 MPa or more and the chemical composition shown in Table 1. The sheet thickness of the upper steel sheet was 1.0 mm, and the sheet thickness of the lower steel sheet was 1.2 mm. This member was placed on a concave metal jig such as the one illustrated in FIG. 4. The support distance was 30 mm, and a ground electrode was attached to the bottom of the jig. The member was welded by applying pressure with a welding electrode from above. The overlapping upper and lower steel sheets were brought into close contact with each other by fastening them, at both ends, on the jig with clamps so that shunt current would be more likely to occur between the steel sheets during application of current. Hence, conditions that impede the formation of a nugget directly below the electrode were intentionally established.

A direct-current inverter power supply was used for the welding. The electrodes used for the welding were made of chromium-copper alloy. The electrode end portion of each welding electrode included a tip of the welding electrode, and as viewed from the tip, the electrode end portion had a two-step dome shape formed by a first curved surface with a curvature radius $r_1$ (mm) located within a range of a circle of radius R (mm) centering on the tip and a second curved surface with a curvature radius $r_2$ (mm) located around the first curved surface. Table 2 lists the dimensions of R, $r_1$, and $r_2$. Table 2 also lists the electrode radius of the bottom of the electrode end portion of each welding electrode. Furthermore, Table 2 lists the conditions on the time period from turning on to turning off electricity and on the electrode force and current in each time period. Indirect spot welding was performed for Nos. 1 to 16 under the conditions listed in Table 2.

TABLE 1

| Chemical Composition | C | Si | Mn | P | S |
|---|---|---|---|---|---|
| (mass %) | 0.003 | Tr | 0.09 | 0.016 | 0.004 |

TABLE 2

| | | Electrode shape | | | | Electrode force/Current/Time | |
|---|---|---|---|---|---|---|---|
| | | | | | | First stage | Second stage |
| No. | Standard | R (mm) | $r_1$ (mm) | $r_2$ (mm) | electrode radius (mm) | Top: electrode force (N)/time (s) Bottom: current (kA)/time (s) | Top: electrode force (N)/time (s) Bottom: current (kA)/time (s) |
| 1 | Comparative Example | 1.5 | 20 | 6 | 6 | 800/0.36 9.0/0.36 | — — |
| 2 | Example | 2 | 40 | 6 | 6 | 800/0.36 9.0/0.36 | — — |
| 3 | Example | 3 | 60 | 8 | 8 | 800/0.36 9.0/0.36 | — — |
| 4 | Example | 4 | 70 | 8 | 8 | 800/0.36 9.0/0.36 | — — |
| 5 | Example | 5 | 60 | 9.5 | 9.5 | 800/0.36 9.0/0.36 | — — |
| 6 | Example | 6 | 60 | 8 | 8 | 800/0.36 9.0/0.36 | — — |
| 7 | Comparative Example | 8 | 60 | 8 | 9.5 | 800/0.36 9.0/0.36 | — — |
| 8 | Comparative Example | 2 | 40 | 4 | 4 | 800/0.36 9.0/0.36 | — — |
| 9 | Comparative Example | 2 | 40 | 12.5 | 12.5 | 800/0.36 9.0/0.36 | — — |
| 10 | Comparative Example | 2 | 10 | 8 | 8 | 800/0.36 9.0/0.36 | — — |
| 11 | Comparative Example | 12 | 40 | 8 | 12.5 | 400/0.36 9.0/0.36 | — — |
| 12 | Comparative Example | 1.5 | 20 | 8 | 8 | 800/0.18 9.0/0.18 | 400/0.18 9.0/0.18 |
| 13 | Comparative Example | 1.5 | 20 | 8 | 6 | 800/0.18 4.0/0.18 | 400/0.36 9.0/0.36 |
| 14 | Example | 4 | 40 | 9 | 8 | 800/0.18 9.0/0.18 | 400/0.18 9.0/0.18 |

TABLE 2-continued

| | | Electrode shape | | | Electrode force/Current/Time | |
|---|---|---|---|---|---|---|
| | | | | | First stage | Second stage |
| No. | Standard | R (mm) | $r_1$ (mm) | $r_2$ (mm) | electrode radius (mm) | Top: electrode force (N)/time (s) Bottom: current (kA)/time (s) | Top: electrode force (N)/time (s) Bottom: current (kA)/time (s) |
| 15 | Example | 5 | 30 | 10 | 8 | 800/0.18 4.0/0.18 | 400/0.36 9.0/0.36 |
| 16 | Example | 6 | 40 | 8 | 8 | 800/0.12 4.0/0.18 | 400/0.42 9.0/0.36 |

The electrode shape of the welding electrode used in Nos. 2 to 6 and 14 to 16 in Table 2 satisfies the requirements of our method. On the other hand, the electrode shape of the welding electrode used in Nos. 1 and 7 to 13 does not satisfy the requirements of our method. The electrode force F and the current C are constant in Nos. 1 to 11 in Table 2. For Nos. 12 and 14, the time period for application of current was divided into time periods $t_1$ and $t_2$, and while keeping the current constant, the electrode force F was controlled. For Nos. 13 and 15, the time period was divided into time periods $t_1$ and $t_2$, and the electrode force F and the current C were controlled simultaneously. For No. 16, with respect to the electrode force, the time from turning on electricity was divided into two time periods $t_{F1}$ and $t_{F2}$, and with respect to the current, the time from turning on electricity was divided into two time periods $t_{C1}$ and $t_{C2}$ independent of the time periods $t_{F1}$ and $t_{F2}$. The electrode force F and the current C were thus controlled independently.

Table 3 shows the nugget diameter, nugget thickness, and nugget thickness/diameter of each joint, and also shows observations of defects in appearance, for the welding performed in accordance with the electrode shapes and current application patterns shown in Table 2.

In Table 3, the nugget diameter was taken to be the length, in a cross-section taken along the center of the weld, of the fused portion formed along the mating line between the upper and lower steel sheets. The nugget thickness was taken to be the maximum thickness, in a cross-section taken along the center of the weld, of the fused portion formed between the upper and lower steel sheets. The nugget thickness/diameter was obtained by dividing the above nugget thickness by the above nugget diameter. If the nugget diameter is 4 mm or more and the nugget thickness/diameter is 0.22 or more, the nugget may be judged as being suitable.

As for defects in appearance caused by fusion and scattering of the weld, the occurrence of splattering and dropping occurring at the lower steel sheet of the weld was disclosed in Table 3 as "burn-through."

Furthermore, overall evaluation was made based on the following criteria:
Pass: nugget diameter of 4 mm or more, nugget thickness/diameter of 0.22 or more, and no defect in appearance
Fail: satisfaction of any one of the conditions of nugget diameter of less than 4 mm, nugget diameter thickness/diameter of less than 0.22, or a defect in appearance.

TABLE 3

| No. | Standard | Nugget diameter (mm) | Nugget thickness (mm) | Nugget thickness/diameter | Defect in appearance | Overall evaluation |
|---|---|---|---|---|---|---|
| 1 | Comparative Example | 0 | 0 | — | burn through | fail |
| 2 | Example | 4.1 | 1.5 | 0.37 | none | pass |
| 3 | Example | 5.5 | 1.5 | 0.27 | none | pass |
| 4 | Example | 4.9 | 1.1 | 0.22 | none | pass |
| 5 | Example | 4.5 | 1.1 | 0.24 | none | pass |
| 6 | Example | 4.4 | 1.0 | 0.23 | none | pass |
| 7 | Comparative Example | 4.5 | 0.5 | 0.11 | none | fail |
| 8 | Comparative Example | 0 | 0 | — | burn through | fail |
| 9 | Comparative Example | 3.8 | 1.6 | 0.42 | none | fail |
| 10 | Comparative Example | 0 | 0 | — | burn through | fail |
| 11 | Comparative Example | 3.5 | 1.5 | 0.43 | none | fail |
| 12 | Comparative Example | 0 | 0 | — | burn through | fail |
| 13 | Comparative Example | 0 | 0 | — | burn through | fail |
| 14 | Example | 5.8 | 2.0 | 0.34 | none | pass |
| 15 | Example | 6.2 | 2.3 | 0.37 | none | pass |
| 16 | Example | 5.4 | 1.5 | 0.28 | none | pass |

As shown in Table 3, for Nos. 2 to 6 and 14 to 16, in which indirect spot welding was performed using a welding electrode satisfying the requirements of our method with respect to a sheet thickness of 1.0 mm for the thinner steel sheet, a fused nugget with a sufficient nugget diameter and sufficient thickness for the diameter were obtained, and no defect in appearance whatsoever was observed, even under the intentionally established conditions that impeded formation of a nugget directly below the electrode.

By contrast, for No. 7, in which a welding electrode not satisfying the requirements of our method was used, the nugget thickness/diameter did not satisfy the condition of being less than 0.22. For Nos. 9 and 11, the nugget diameter was insufficient. Furthermore, for Nos. 1, 8, 10, 12, and 13, nugget formation was not observed, and burn-through occurred.

Example 2

Indirect spot welding was performed under the same conditions as Example 1 for Nos. 1 to 6, except that the sheet thickness of the upper steel sheet was 1.0 mm, the sheet thickness of the lower sheet was 0.7 mm, and the conditions on the electrode shape of the welding electrode, the time periods from turning on to turning off electricity, and the electrode force and current in each time period were set as shown in Table 4.

TABLE 4

| No. | Standard | Electrode shape | | | | Electrode force/Current/Time |
|-----|----------|---|---|---|---|---|
| | | R (mm) | $r_1$ (mm) | $r_2$ (mm) | electrode radius (mm) | Top: electrode force (N)/time (s) Bottom: current (kA)/time (s) |
| 1 | Comparative Example | 1.5 | 20 | 6 | 6 | 200/0.18 8.0/0.18 |
| 2 | Example | 2 | 40 | 6 | 6 | 200/0.18 8.0/0.18 |
| 3 | Example | 3 | 60 | 8 | 8 | 200/0.18 8.0/0.18 |
| 4 | Example | 4 | 70 | 8 | 8 | 200/0.18 8.0/0.18 |
| 5 | Example | 5 | 60 | 9.5 | 9.5 | 200/0.18 8.0/0.18 |
| 6 | Comparative Example | 6 | 60 | 8 | 8 | 200/0.18 8.0/0.18 |

The electrode shape of the welding electrode used in Nos. 2 to 5 in Table 4 satisfies the requirements of our method. On the other hand, the electrode shape of the welding electrode used in Nos. 1 and 6 does not satisfy the requirements of our method. The electrode force F and the current C are constant in Nos. 1 to 6 in Table 4.

Table 5 shows the nugget diameter, nugget thickness, and nugget thickness/diameter of each joint, and also shows observations of defects in appearance, for the welding performed in accordance with the electrode shapes and current application patterns shown in Table 4. The nugget diameter and nugget thickness in Table 5 are as described in Example 1. If the nugget diameter is 3.4 mm or more and the nugget thickness/diameter is 0.20 or more, the nugget may be judged as being suitable.

As for defects in appearance caused by fusion and scattering of the weld, the occurrence of splattering and dropping occurring at the lower steel sheet of the weld was disclosed in Table 5 as "burn-through."

Furthermore, overall evaluation was made based on the following criteria.

Pass: nugget diameter of 3.4 mm or more, nugget thickness/diameter of 0.20 or more, and no defect in appearance Fail: satisfaction of any one of the conditions of nugget diameter of less than 3.4 mm, nugget diameter thickness/diameter of less than 0.20, or a defect in appearance

TABLE 5

| No. | Standard | Nugget diameter (mm) | Nugget thickness (mm) | Nugget thickness/ diameter | Defect in appearance | Overall evaluation |
|-----|----------|---|---|---|---|---|
| 1 | Comparative Example | 0 | 0 | — | burn through | Fail |
| 2 | Example | 3.8 | 1.0 | 0.26 | none | pass |
| 3 | Example | 3.9 | 0.9 | 0.23 | none | pass |
| 4 | Example | 3.6 | 0.8 | 0.22 | none | pass |
| 5 | Example | 3.4 | 0.7 | 0.21 | none | pass |
| 6 | Comparative Example | 3.2 | 0.5 | 0.16 | none | pass |

As shown in Table 5, for Nos. 2 to 5, in which indirect spot welding was performed using a welding electrode satisfying the requirements of our method with respect to a sheet thickness of 0.7 mm for the thinner steel sheet, a fused nugget with a sufficient nugget diameter and sufficient thickness for the diameter were obtained, and no defect in appearance whatsoever was observed, even under the intentionally established conditions that impeded the formation of a nugget directly below the electrode.

By contrast, for No. 6, in which a welding electrode not satisfying the requirements of our method was used, the nugget diameter was insufficient, and the nugget thickness/diameter was less than 0.20. For No. 1, nugget formation was not observed, and burn-through occurred.

INDUSTRIAL APPLICABILITY

In our method, a welding electrode with an appropriately shaped electrode end portion is used. Therefore, an oval nugget formed after fusion between metal sheets can more stably be obtained even when current flow between the metal sheets at a location other than the weld, i.e., shunt current, is large.

The invention claimed is:

1. A method of indirect spot welding for welding a member composed of two overlapping metal sheets, the method comprising:

holding a spot welding electrode against the two overlapping metal sheets while applying pressure with the spot welding electrode from one side of the member;

attaching a feeding point to the other side of the member at a location remote from the spot welding electrode; and allowing current to indirectly flow between the spot welding electrode and the feeding point to form an oval nugget, wherein an electrode end portion of the welding electrode includes a tip of the welding electrode, and as viewed from the tip, the electrode end portion has a two-step dome shape formed by a first curved surface with a curvature-radius $r_1$ (mm) located within a range of a circle of radius R (mm) centering on the tip and a second curved surface with a curvature-radius $r_2$ (mm) located at edge of the tip and around the first curved surface, and $$2\sqrt{t} \leq R \leq 6\sqrt{t} \quad (1)$$

$$30 \leq r_1 \leq 70 \quad (2)$$

$$6 \leq r_2 \leq 10 \quad (3)$$

where t is a sheet thickness (mm) of a thinner metal sheet of the two metal sheets in the member.

2. The method of claim 1, wherein the method further comprising:

maintaining a constant current from turning on to turning off power supply; and with respect to electrode force, a duration of the indirect spot welding of the member is divided into two time periods $t_1$ and $t_2$, wherein the method includes applying electrode force set at $F_1$ in a first time period $t_1$, and applying electrode force set at $F_2$ lower than the electrode force $F_1$ in a second time period $t_2$.

3. The method of claim 1, wherein, with respect to electrode force and the current, a duration of the indirect spot welding of the member is divided into two time periods $t_1$ and $t_2$, wherein the method includes applying electrode force set at $F_1$ and current set at $C_1$ in a first time period $t_1$, and applying electrode force set at $F_2$ lower than the electrode force $F_1$ and current set at $C_2$ higher than the current $C_1$ in a second time period $t_2$.

4. The method of claim 1, wherein with respect to electrode force, a duration of the indirect spot welding of the member is divided into two time periods $t_{F1}$ and $t_{F2}$, wherein the method includes applying electrode force set at $F_1$ in a first time period $t_{F1}$, and applying electrode force set at $F_2$ lower than the electrode force $F_1$ in a second time period $t_{F2}$, and with respect to the current, a duration of the indirect spot welding of the member is divided, independent of time periods $t_{F1}$ and $t_{F2}$, into two time periods $t_{C1}$ and $t_{C2}$, wherein the method includes applying current set at $C_1$ in a first time period $t_{C1}$, and applying current set at $C_2$ higher than the current $C_1$ in a second time period $t_{C2}$.

* * * * *